US009880855B2

(12) United States Patent
Zou et al.

(10) Patent No.: US 9,880,855 B2
(45) Date of Patent: Jan. 30, 2018

(54) START-UP CONTROL PROGRAM, DEVICE, AND METHOD

(71) Applicant: FUJITSU LIMITED, Kawasaki-shi, Kanagawa (JP)

(72) Inventors: Yun Zou, Yokohama (JP); Takahiro Kojima, Yokohama (JP); Rikiya Ayukawa, Yokohama (JP); Noriaki Kurokawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 365 days.

(21) Appl. No.: 14/525,299

(22) Filed: Oct. 28, 2014

(65) Prior Publication Data

US 2015/0134806 A1    May 14, 2015

(30) Foreign Application Priority Data

Nov. 13, 2013   (JP) .................................. 2013-234984

(51) Int. Cl.
G06F 15/16       (2006.01)
G06F 9/44        (2006.01)
G06F 11/14       (2006.01)

(52) U.S. Cl.
CPC ........ G06F 9/4405 (2013.01); G06F 11/1417 (2013.01)

(58) Field of Classification Search
CPC ........................... G06F 9/4405; G06F 11/1417
See application file for complete search history.

(56) References Cited

U.S. PATENT DOCUMENTS

| 6,154,848 | A | 11/2000 | Igarashi et al. | |
| 7,243,245 | B2 * | 7/2007 | Pagan | G06F 9/4406 713/1 |
| 7,702,891 | B1 * | 4/2010 | Nazarov | G06F 9/445 713/1 |
| 8,886,758 | B2 * | 11/2014 | Safari | H04L 41/00 707/781 |
| 2009/0106256 | A1 * | 4/2009 | Safari | G06F 11/1433 |
| 2009/0300374 | A1 * | 12/2009 | Mori | G06F 1/3203 713/300 |

(Continued)

FOREIGN PATENT DOCUMENTS

| JP | 9-50406 | 2/1997 |
| JP | 2000-22744 | 1/2000 |

(Continued)

OTHER PUBLICATIONS

Patent Abstracts of Japan, Publication No. 09-050406, published Feb. 18, 1997.

(Continued)

*Primary Examiner* — Douglas Blair
(74) *Attorney, Agent, or Firm* — Staas & Halsey LLP

(57) ABSTRACT

A start-up control device includes a processor that executes a procedure. The procedure includes: acquiring data relating to communication processing when communication connection of plural data processing devices is initiated; and based on the acquired data relating to communication processing, controlling start-up of the plural data processing devices such that a data processing device that transmitted a response to a request for the connection is started-up earlier than a data processing device that transmitted the request.

15 Claims, 12 Drawing Sheets

(56) References Cited

U.S. PATENT DOCUMENTS

| | | | | |
|---|---|---|---|---|
| 2010/0325278 A1* | 12/2010 | Heim | ................... | G06F 9/4416 |
| | | | | 709/226 |
| 2011/0231846 A1* | 9/2011 | Sabin | ................... | G06F 9/5072 |
| | | | | 718/100 |
| 2012/0317425 A1* | 12/2012 | Shao | ..................... | H04L 12/10 |
| | | | | 713/300 |
| 2013/0198384 A1* | 8/2013 | Kirsch, II | ............ | G06F 15/161 |
| | | | | 709/226 |
| 2014/0372533 A1* | 12/2014 | Fu | ........................ | H04L 67/10 |
| | | | | 709/204 |
| 2015/0301845 A1* | 10/2015 | Chu | ...................... | G06F 9/485 |
| | | | | 718/1 |

FOREIGN PATENT DOCUMENTS

| | | |
|---|---|---|
| JP | 2011-39745 | 2/2011 |
| JP | 2012-108651 | 6/2012 |

OTHER PUBLICATIONS

Patent Abstracts of Japan, Publication No. 2012-108651, published Jun. 7, 2012.
Japanese Office Action dated Aug. 1, 2017 in the related Japanese Patent Application No. 2013-234984 **.

* cited by examiner

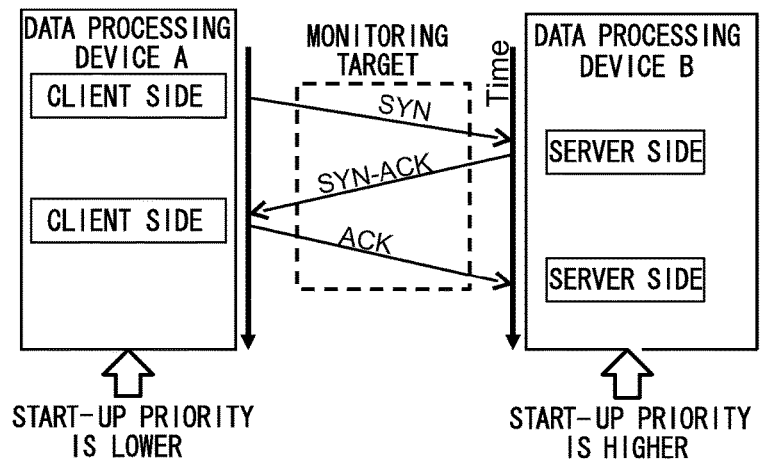

| EVENT TAB | PORT NUMBER OF DATA PROCESSING DEVICE HAVING LOWER START-UP PRIORITY | PORT NUMBER OF DATA PROCESSING DEVICE HAVING HIGHER START-UP PRIORITY | IP OF DATA PROCESSING DEVICE HAVING LOWER START-UP PRIORITY | IP OF DATA PROCESSING DEVICES HAVING HIGHER START-UP PRIORITY |
|---|---|---|---|---|
| START-UP PRIORITY RELATIONSHIP | 21 | 1092 | 192.168.10.2 | 192.168.10.1 |

FIG.4

| PORT NUMBER OF DATA PROCESSING DEVICE HAVING LOWER START-UP PRIORITY | PORT NUMBER OF DATA PROCESSING DEVICE HAVING HIGHER START-UP PRIORITY | IP OF DATA PROCESSING DEVICES HAVING LOWER START-UP PRIORITY | IP OF DATA PROCESSING DEVICE HAVING HIGHER START-UP PRIORITY |
|---|---|---|---|
| 21 | 1092 | 192.168.10.3 | 192.168.10.1 |
| 21 | 1093 | 192.168.10.1 | 192.168.102.1 |
| ... | ... | ... | ... |

FIG.5

| EVENT TAB | IP OF DATA PROCESSING DEVICE |
|---|---|
| POWER SUPPLY INTERRUPT | 192.168.10.1 |

FIG.6

| TRANSMISSION DESTINATION | TRANSMISSION SOURCE PORT | TRANSMISSION DESTINATION IP | TRANSMISSION SOURCE IP |
|---|---|---|---|
| 21 | - | - | - |
| 139 | - | - | 192.168.10.2 |
| 2013 | 36000 - 36100 | 192.168.11.5 | 192.168.12.5 |
| 36000 - 36100 | 139 | - | 192.168.10.2 |
| ... | | ... | ... |

FIG.7

| DATA PROCESSING DEVICE NUMBER | IP ADDRESS | PRIORITY START-UP DATA PROCESSING DEVICE NUMBER LIST | START-UP PRIORITY |
|---|---|---|---|
| 0 | 192.168.10.1 | 1,2 | 1 |
| 1 | 192.168.102.1 | 3 | 2 |
| 2 | 192.168.11.5 | 4 | 2 |
| 3 | 192.168.12.5 | | 3 |
| 4 | 192.168.101.2 | | 3 |
| ... | ... | ... | ... |

FIG.14

| DATA PROCESSING DEVICE NUMBER | IP ADDRESS | PRIORITY START-UP DATA PROCESSING DEVICE NUMBER LIST | START-UP PRIORITY |
|---|---|---|---|
| 0 | 192.168.10.1 | 1,2 | 1 |
| 1 | 192.168.102.1 | 3 | 2 |
| 2 | 192.168.11.5 | 4 | 2 |
| 3 | 192.168.12.5 |  | 3 |
| 4 | 192.168.101.2 |  | 3 |
| 5 | 192.168.10.2 |  | 1 |
| ... | ... | ... | ... |

FIG.15

| DATA PROCESSING DEVICE NUMBER | IP ADDRESS | PRIORITY START-UP DATA PROCESSING DEVICE NUMBER LIST | START-UP PRIORITY |
|---|---|---|---|
| 0 | 192.168.10.1 | 1,2 | 1 |
| 1 | 192.168.102.1 | 3 | 2 |
| 2 | 192.168.11.5 | 4 | 2 |
| 3 | 192.168.12.5 |  | 3 |
| 4 | 192.168.101.2 |  | 3 |
| 5 | 192.168.10.2 | 0 | 1 |
| ... | ... | ... | ... |

| DATA PROCESSING DEVICE NUMBER | IP ADDRESS | PRIORITY START-UP DATA PROCESSING DEVICE NUMBER LIST | START-UP PRIORITY |
|---|---|---|---|
| 0 |  | 1,2 | 2 |
| 1 | 192.168.102.1 | 3 | 3 |
| 2 | 192.168.11.5 | 4 | 3 |
| 3 | 192.168.12.5 |  | 4 |
| 4 | 192.168.101.2 |  | 4 |
| 5 | 192.168.10.2 | 0 | 1 |
| ... | ... | ... | ... |

START-UP CONTROL PROGRAM, DEVICE, AND METHOD

CROSS-REFERENCE TO RELATED APPLICATION

This application is based upon and claims the benefit of priority of the prior Japanese Patent Application No. 2013-234984, filed on Nov. 13, 2013, the entire content of which is incorporated herein by reference.

FIELD

The embodiments discussed herein are related to a start-up control program, start-up control device, and start-up control method.

BACKGROUND

In, for example, disaster counter-measure systems and the like, specification of a sequence in which to start-up data processing devices is necessary when starting up plural data processing devices when restoring affected businesses to a back-up site or the like. For example, it is necessary to start-up authentication servers, application servers, and web servers in that order. Consideration of connection relationships between management servers and management-target servers is also necessary in start-up sequences for domain configuration cluster servers included in logical servers. Conventionally, a management system is input with a manually specified sequence when starting up plural data processing devices. It should be noted that the above authentication servers, application servers, web servers, management servers, and management-target servers are examples of data processing devices.

A cluster system, for example, has been proposed in order to comply with the service level of a business system. A restart sequence, for service levels that are business systems to be migrated, and for plural virtual servers, is stored in a cluster system, and virtual server migration outcomes are detected. Restart times are measured and updated for virtual servers during virtual server maintenance, and the amount of redundancy in plural virtual servers is calculated. Moreover, in such a cluster system, new restart sequences are determined based on detected redundancy amounts, detected migration outcomes, stored service levels, and updated restart times.

Another technique has been proposed that protects systems based on the result of investigating the presence of inconsistencies related to workflow history data between servers. In this technique, connection is made to a wide area network, and a history of operations is retained for each of plural workflow systems that automatically execute operations according to a workflow stipulating the flow of each operation. Operation history retained during restoration from work system downtime of workflow systems is utilized and reliability ascertained.

RELATED PATENT DOCUMENTS

Japanese Laid-Open Patent Publication No. 2012-108651
Japanese Laid-Open Patent Publication No. H09-050406

In a cloud environment, since there are a large number of data processing devices for which the start-up sequence should be considered, manually designating and inputting the start-up sequence of the data processing devices to a management system generates a large workload.

In the above conventional technology in which the migration outcomes or the like are detected, and a restart sequence of virtual servers designated, the correct start-up sequence is manually set as a start-up rule for virtual servers for a business system unable to perform business correctly if the start-up sequence is flawed. Thus, in the conventional technology, problems of the risk of input oversight and input errors, and the generation of a large workload, as described above, cannot be resolved.

In the above conventional techniques that protect a system based on the operation history of a workflow, processing simplification is facilitated by employing connection relationships between servers, and deducing operation histories. However, in this technique, the start-up sequence of data processing devices is not considered.

SUMMARY

An object of one aspect of the present invention is to control start-up sequences of plural data processing devices considered in communication initiation processing.

According to an aspect of the embodiments, a non-transitory recording medium stores a start-up control program that causes a computer to execute a process, the process including: acquiring data relating to communication processing when communication connection of plural data processing devices is initiated; and based on the acquired data relating to communication processing, controlling start-up of the plural data processing devices such that a data processing device that transmitted a response to a request for the connection is started-up earlier than a data processing device that transmitted the request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a schematic diagram illustrating a three-way handshake in TCP communication.

FIG. 3 is a diagram illustrating an example of data repeating start-up priority relationships.

FIG. 4 is a diagram illustrating an example of a completed notification list.

FIG. 5 is a diagram illustrating an example of power supply interruption data.

FIG. 6 is a diagram illustrating an example of an exclusion list.

FIG. 7 is a diagram illustrating an example of a management table.

FIG. 14 is a diagram illustrating an example of a management table.

FIG. 15 is a diagram illustrating an example of a management table.

DESCRIPTION OF EMBODIMENTS

An example of an exemplary embodiment according to technology disclosed herein is described in detail below with reference to the drawings.

Figure 1:
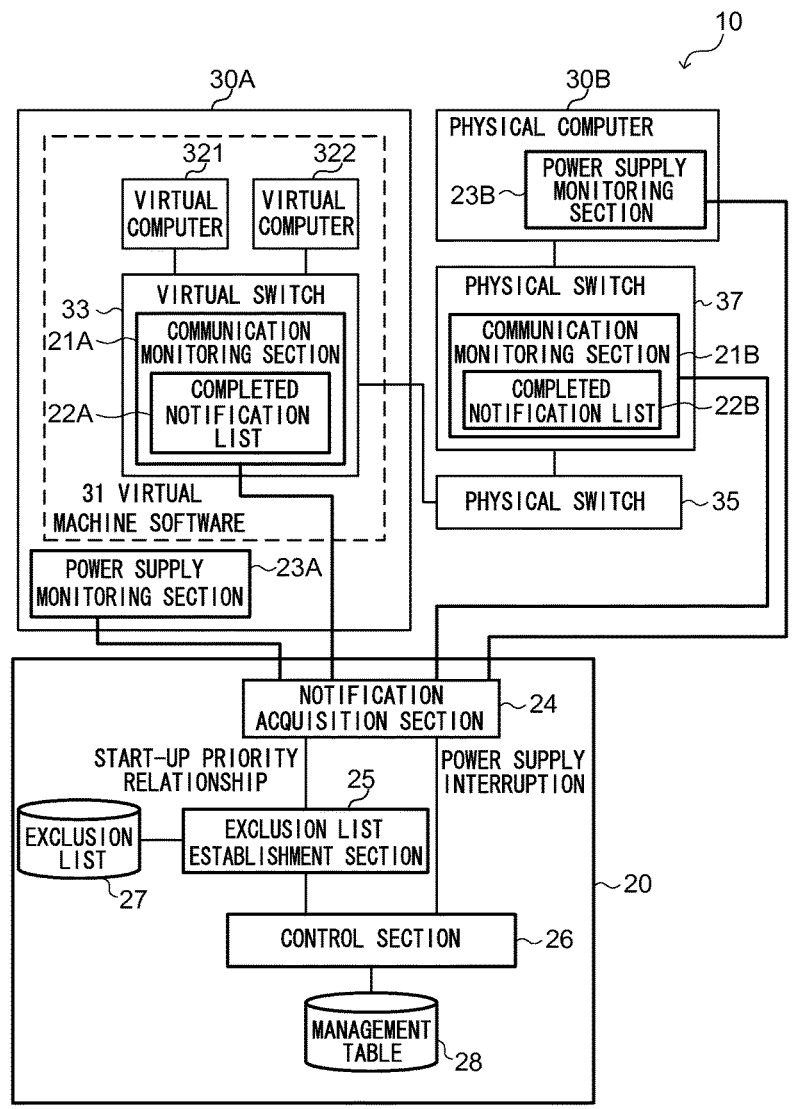
FIG. 1 is a block diagram illustrating a schematic configuration of a start-up control system according to an exemplary embodiment.

As illustrated in FIG. 1, a start-up control system 10 includes a start-up control device 20, communication monitoring sections 21A, 21B, and power supply monitoring sections 23A, 23B.

The start-up control system 10 manages a start-up priority of each data processing device for designating a start-up sequence when starting up plural data processing devices included in a control-target network, and controls the start-up of each data processing device. Control-target data processing devices include physical computers, and virtual computers. In the example of FIG. 1, the data processing devices are a virtual computer 321 and a virtual computer 322 constructed by virtual machine (VM) software 31 operating on a physical computer 30A, and a physical computer 30B. Note that the virtual computer 321 and the virtual computer 322 constructed by the virtual machine software 31, are connected to an external physical switch 35 through a virtual switch 33 constructed by the virtual machine software 31.

The communication monitoring section 21A is provided in the virtual switch 33. The communication monitoring section 21A monitors communication between the virtual computer 321 and the virtual computer 322, communication between the virtual computer 321 and external data processing devices, and communication between the virtual computer 322 and external data processing devices. The communication monitoring section 21A includes a completed notification list 22A, described below. The communication monitoring section 21B is provided in a physical switch 37 that switches input and output of the physical computer 30B. The communication monitoring section 21B monitors communication between the physical computer 30B and external data processing devices. The communication monitoring section 21B includes a completed notification list 22B, described below.

Note that the location where the communication monitoring section 21A and the communication monitoring section 21B are provided is not limited to inside a switch, as long as they are on a communication channel able to communicate with the data processing devices.

Below, where explanation does not distinguish between the communication monitoring section 21A and the communication monitoring section 21B, these are simply denoted "communication monitoring section 21". Where explanation does not distinguish between the completed notification list 22A and the completed notification list 22B, these are simply denoted "completed notification list 22".

The communication monitoring section 21 monitors communication between the plural data processing devices, and detects communication that include data related to communication processing between request side data processing devices and response side data processing devices. The request side data processing device is the data processing device that transmitted a request to initiate a communication connection between data processing devices, for example, the client side data processing device in a client/server configuration. The request side data processing device is the data processing device that transmitted a response to the request for initiation of a communication connection between data processing devices, for example, the server side data processing devices in a client/server configuration. Moreover, the communication monitoring section 21 decides the start-up priority relationship between the request side data processing device and the response side data processing device based on data related to data related to detected communication processing.

In the present embodiment, the communication monitoring section 21 detects communication during a three-way handshake connection serving as communication having data relating to start-up priority relationships. A three-way handshake connection is a connection method for confirming a connection between two data processing devices. For example, as illustrated in FIG. 2, in a three-way handshake in a TCP communication, firstly, the client side data processing device A transmits an SYN packet indicating a request for communication to a server side data processing device B. Next, the data processing device B transmits an SYN-ACK packet indicating an acceptance of the connection to the data processing device A. The data processing device A then transmits an ACK packet indicating the initiation of a connection to the data processing device B.

For example, in a server/client configuration the server side data processing device needs to start-up before the client side data processing device. Namely, the server side data processing device has a higher start-up priority than the client side data processing device. The communication monitoring section 21 then identifies one of the two data processing devices as the request side (client side) data processing device, and one as the response side (server side) data processing device, based on communication of the three-way handshake connection. The communication monitoring section 21 then creates data indicating a start-up priority relationship in which the response side data processing device has higher start-up priority than the request side data processing device, and notifies the start-up control device 20.

An example of data indicating a start-up priority relationship notified by the communication monitoring section 21 is illustrated in FIG. 3. An event tab displaying data indicating a start-up priority relationship, the IP address and a port number of a data processing device having high start-up priority, and the IP address and a port number of a data processing device having low start-up priority are data included in the example of FIG. 3. Note that the port number is data used for identification of communication content used to establish start-up priority relationships in an exclusion list establishment section 25, described later.

The communication monitoring section 21 is configured so as not to re-notify start-up priority relationships the same as to start-up priority relationships of past completed notifications when a start-up priority relationship is notified to the start-up control device 20. Specifically, the communication monitoring section 21 registers communication contents that become sources from which start-up priority relationships of completed notifications are established, in the completed notification list 22 included in the communication monitoring section 21. The communication monitoring section 21 cross-references communication contents registered in the completed notification list 22 with detected communication contents. Communication for which the completed notification list 22 contains matching contents are not used by the communication monitoring section 21 for establishing start-up priority relationships. Start-up priority relationships of completed notifications are thereby prevented from being re-notified, and a reduction in superfluous communication between the communication monitoring section 21 and the start-up control device 20 is enabled.

An example of the completed notification list 22 is illustrated in FIG. 4. The IP address and a port number of a data processing device having low start-up priority, and the IP address and a port number of a data processing device having high start-up priority, are data included in the example of FIG. 4.

The power supply monitoring section 23A is provided to the physical computer 30A, and the power supply monitoring section 23B is provided to the physical computer 30B. Where explanation does not distinguish between the power supply monitoring section 23A and the power supply monitoring section 23B below, these are simply denoted "power supply monitoring section 23". Where explanation does not distinguish between the physical computer 30A and the physical computer 30B, these are simply denoted "physical computer 30".

The power supply monitoring section 23 monitors the start-up status of each of the physical computers 30. The power supply monitoring section 23 notifies power supply interruption data, indicating the data processing device for which the power supply was interrupted, to the start-up control device 20, when detecting that the power supply to the physical computer 30 is interrupted, namely, a switch of the power supply from an ON state to an OFF state. An example of power supply interruption data notified by the power source monitoring section 23 is illustrated in FIG. 5. An event tab displaying data that is power supply interruption data, and IP address data of the data processing device to which the power supply was interrupted are included in the example of FIG. 5.

As illustrated in FIG. 1, the start-up control device 20 includes a notification acquisition section 24, the exclusion list establishment section 25, and a control section 26.

The notification acquisition section 24 acquires data representing start-up priority relationships notified from the communication monitoring section 21, and transfers the acquired data to the exclusion list establishment section 25. The notification acquisition section 24 acquires power supply interruption data notified from the power source monitoring section 23, and transfers the acquired data to the control section 26.

The exclusion list establishment section 25 excludes data unrelated to the start-up sequence of the data processing devices from data indicating start-up priority relationships acquired by the notification acquisition section 24. Specifically, the exclusion list establishment section 25 cross-references data indicating acquired start-up priority relationships, and an exclusion list 27, preregistered with data indicating start-up priority relationships to be excluded, and establishes whether or not the acquired data indicating the start-up priority relationships is to be excluded.

For example, exclusion data indicating start-up priority relationships, established based on communication unrelated to start-up priority relationships of the data processing devices such as Telnet communication, UDP communication, and communication of specific applications, are registered in the exclusion list 27. Whether or not a communication is communication of a specific application is established using port number data. The exclusion list establishment section 25 receives exclusion data input to a server through input/output devices such as a mouse, keyboard, and monitor, not illustrated in the drawings, and these are registered in the exclusion list 27.

An example of the exclusion list 27 is illustrated in FIG. 6. A port number and an IP address of a transmission destination, and a port number and IP address of a transmission source are data included in the example of FIG. 6. In the present exemplary embodiment, in data indicating start-up priority relationships the data processing device having a high start-up priority relationship corresponds to the transmission destination, and the data processing device having a low start-up priority corresponds to the transmission source.

The exclusion list establishment section 25 transfers data indicating established start-up priority relationships, that are not to be excluded, to the control section 26.

The control section 26 initializes a management table 28 for managing start-up priorities of each of the data processing devices after the start-up control device 20 first starts up. After initializing the management table 28, the control section 26 updates the management table 28 based on data indicating start-up priority relationships, transferred from the exclusion list establishment section 25, and power supply interruption data transferred from the notification acquisition section 24. Data indicating plural control-target data processing devices, and the start-up priority of each data processing devices, are registered in the management table 28.

An example of the management table 28 is illustrated in FIG. 7. Data processing device numbers, IP addresses, priority start-up data processing device number lists, and start-up priorities are data included in the example of FIG. 7. The data processing device number in the management table 28 is data for distinguishing between each data processing device. The priority start-up data processing device number list is data identifying data processing devices having start-up priority over each data processing device by their data processing device numbers. In the example of FIG. 7, a priority start-up data processing device number list of a data processing device having data processing device number 0 (referred to as "data processing device number 0" below; with data processing devices of other data processing device numbers referred to similarly) is registered with "1, 2". This indicates that data processing device 1, and data processing device 2 have a higher start-up priority than a data processing device 0. The start-up priority is data that determines the start-up sequence when starting up plural data processing devices. The control section 26 controls such that the data processing devices start up in order of highest start-up priority. In the example of FIG. 7, higher numbers indicate higher priority.

Figure 8:
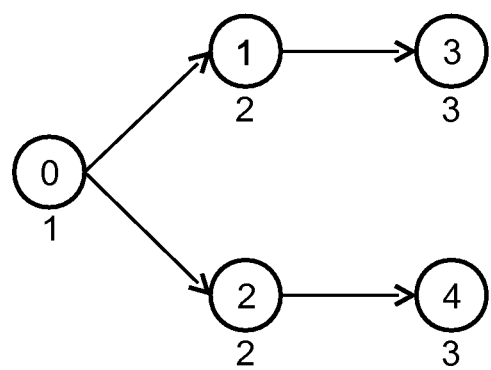
FIG. 8 is a diagram illustrating an example of start-up priority relationships of data processing devices.

FIG. 8 illustrates relationships between the start-up priorities of data processing devices as indicated in the management table 28 of FIG. 7. Each node (circle) in FIG. 8 represents one of the data processing devices. The number in each node is the data processing device number of the data processing devices represented by that node, and the number appended below each node is the start-up priority of the data processing devices represented by that node. Nodes connected by edges indicate a connection relationship between the data processing devices they represent. The start of the edge is a node representing a data processing device with lower start-up priority, and the end of the edge is a node representing a data processing device with higher start-up priority.

Figure 9:
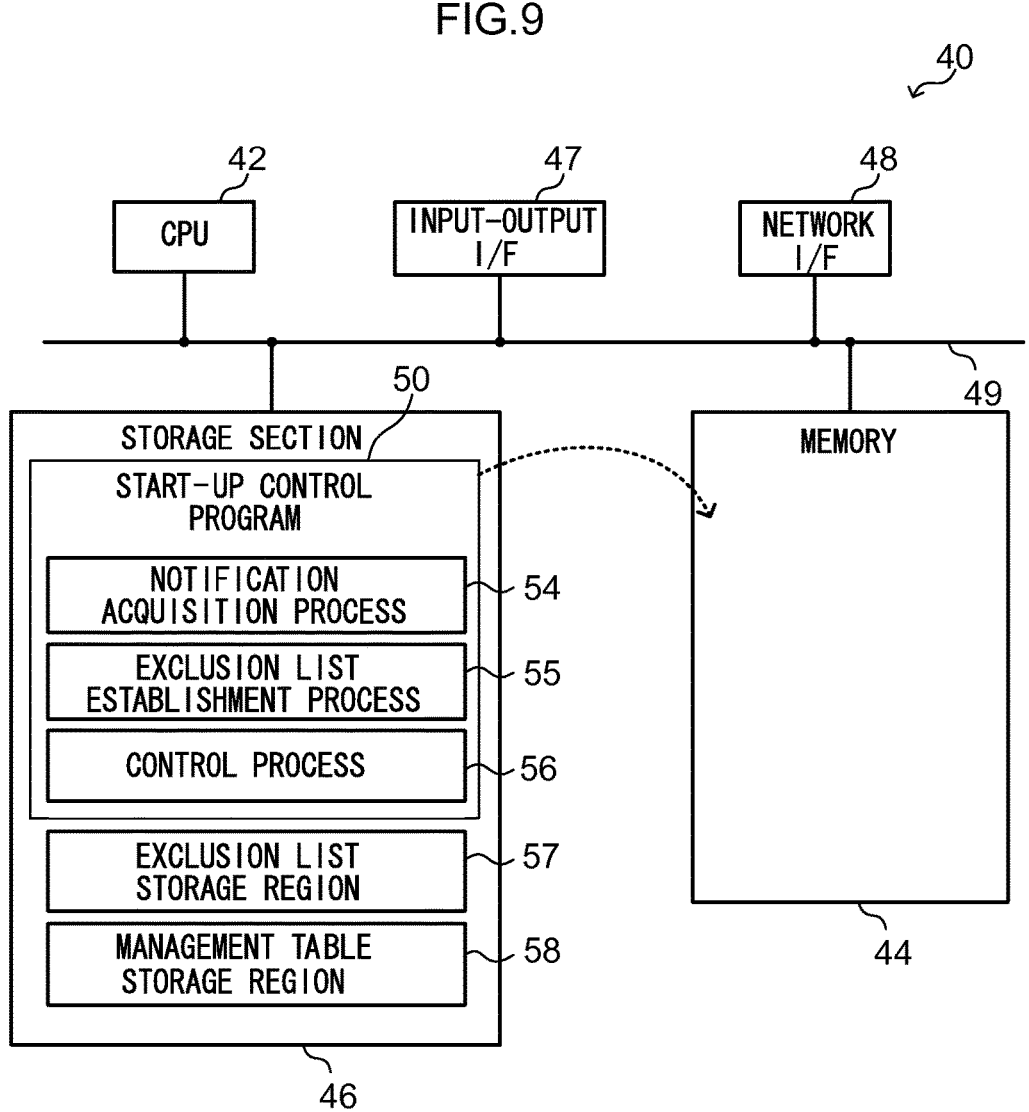
FIG. 9 is a block diagram illustrating an example of a configuration schematic of a computer that functions as a start-up control device according to an exemplary embodiment.

The start-up control device 20 may, for example, be implemented by a computer 40 illustrated in FIG. 9. The computer 40 includes a CPU 42, memory 44, a non-volatile storage section 46, an input/output interface (I/F) 47, and a network I/F 48. The CPU 42, the memory 44, the storage section 46, the input/output interface I/F 47, and the network I/F 48 are connected together through a bus 49.

The storage section 46 may be implemented by a hard disk drive (HDD), flash memory, or the like. The storage section 46 serves as a recording medium stored with a start-up control program 50 for causing the computer 40 to function as the start-up control device 20. Moreover, the storage section 46 includes an exclusion list storage region 57, and a management table storage region 58. The CPU 42 reads the start-up control program 50 from the storage section 46, expands the start-up control program 50 into the memory 44, and sequentially executes a process included in the start-up control program 50.

The start-up control program 50 includes a notification acquisition process 54, an exclusion list establishment process 55, and a control process 56.

The CPU 42 operates as the notification acquisition section 24 illustrated in FIG. 1 by executing the notification acquisition process 54. Moreover, the CPU 42 operates as the exclusion list establishment section 25 illustrated in FIG. 1 by executing the exclusion list establishment process 55. Moreover, the CPU 42 operates as the control section 26 illustrated in FIG. 1 by executing the control process 56.

In cases in which the start-up control device 20 is implemented by the computer 40, the exclusion list storage region 57 is employed as a storage region that stores the exclusion list 27 illustrated in FIG. 1. Moreover, the management table storage region 58 is employed as a storage region that stores the management table 28 illustrated in FIG. 1. The computer 40 that executes the start-up control program 50 thereby functions as the start-up control device 20.

Note that the start-up control device 20 may also be implemented by, for example, a semiconductor accumulation circuit, more specifically, by an application specific integrated circuit (ASIC), or the like.

Next, explanation is given regarding the operation of the start-up control system 10 according to the present exemplary embodiment. The communication monitoring section 21 notifies the start-up control device 20 with data indicating start-up priority relationships by executing communication monitoring processing illustrated in FIG. 10. The power source monitoring section 23 notifies the start-up control device 20 with power supply interruption data by executing power supply monitoring processing illustrated in FIG. 11. The start-up control device 20 updates the management table 28 that manages start-up priorities of plural data processing devices, based on data relating to communication processing between data processing devices, by executing start-up priority management processing illustrated in FIG. 12. Each process is described in detail below. Note that the communication monitoring processing illustrated in FIG. 10 is processing executed in one communication monitoring section 21, and the power supply monitoring processing illustrated in FIG. 11 is processing executed in one power source monitoring section 23.

Figure 10:
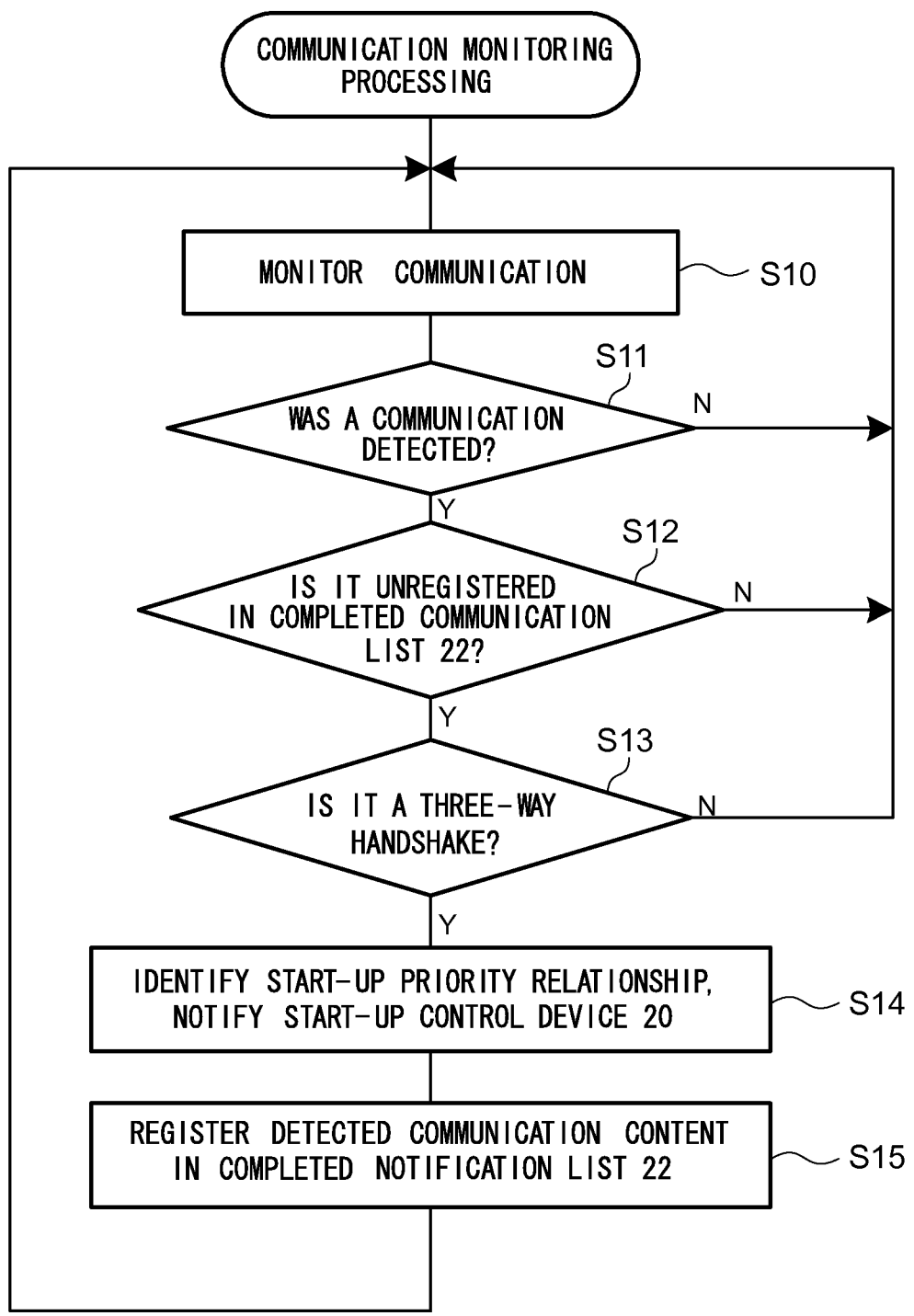
FIG. 10 is a flowchart illustrating communication monitoring processing.
Figure 11:
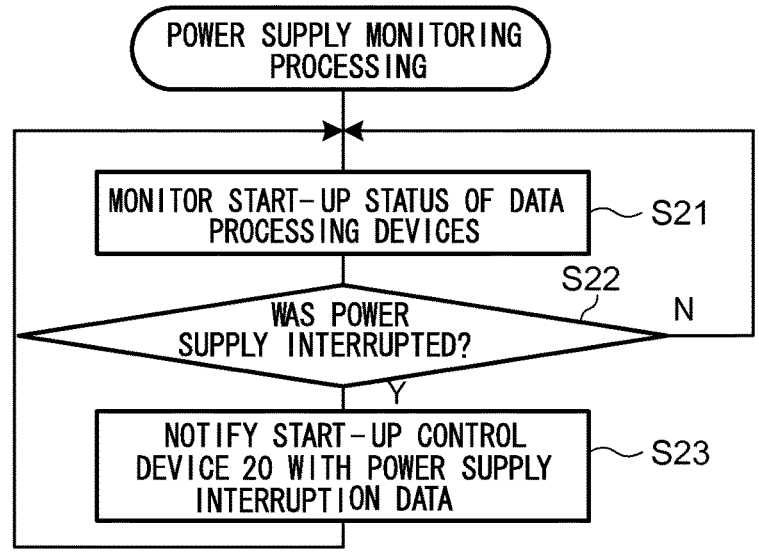
FIG. 11 is a flowchart illustrating power supply monitoring processing.

At step S10 of the communication monitoring processing illustrated in FIG. 10, the communication monitoring section 21 monitors communication between plural data processing devices. Next, at step S11, the communication monitoring section 21 establishes whether or not a communication between data processing devices has been detected. Transition is made to step S12 in cases in which a communication is detected, return is made to step S10 in cases in which a communication is not detected.

At step S12, the communication monitoring section 21 cross-references the content of the detected communication and the content of communication registered in the completed notification list 22 (for example, FIG. 4), and establishes whether or not the content of the detected communication is registered in the completed notification list 22. Transition is made to step S13 in cases in which the content of the detected communication is not registered in the completed notification list 22, and return is made to step S10 in cases in which the content of the detected communication is registered in the completed notification list 22.

At step S13, the communication monitoring section 21 establishes whether or not the detected communication is communication during a three-way handshake connection. This establishment may be performed by the communication monitoring section 21 acquiring a log, indicating established three-way handshake connections, from the operating system (OS) of the data processing device for which the communication was detected. Data indicating which is the request side (client side) data processing device, and which is the response side (server side) data processing device, are included in the log. Moreover, the communication monitoring section 21 may establish whether or not three communication, like those illustrated in FIG. 2 for example, have occurred within the timeout period of a three-way handshake. Transition is made to step S14 in cases in which the detected communication is communication during a three-way handshake connection, and return is made to step S10 in cases in which the detected communication is not communication during a three-way handshake connection.

At step S14, the communication monitoring section 21 identifies which of the two data processing devices is the request side (client side), and which is the response side (server side) data processing device based on the communication during a three-way handshake connection. Identification may be based on the log in cases where the log is acquired from the OS in step S13. In cases in which the communication monitoring section 21 establishes whether or not the communication is of a three-way handshake connection at step 13 based on the content of the communication, the data processing device that sent the initial SYN packet may be identified as the request side data processing device for example. The communication monitoring section 21 generates data (for example, FIG. 3) indicating a start-up priority relationship in which the response side data processing device has higher start-up priority than the request side data processing device, and notifies the start-up control device 20.

Next, at step S15, the communication monitoring section 21 registers the completed notification list 22 with the content of the communication that was the source of the establishment of the start-up priority relationship of the completed notification, and return is made to step S10.

Next, at step S21 of the power supply monitoring processing illustrated in FIG. 11, the power source monitoring section 23 monitors the start-up status of each of the physical computers 30. Next, at step S22, the power source monitoring section 23 establishes whether or not the power supply of the physical computer 30 has been interrupted. Transition is made to step S23 in cases in which the power supply has been interrupted, and return is made to step S21 in cases in which there is no interruption.

At step S23, the power source monitoring section 23 notifies the start-up control device 20 with power supply interruption data indicating a power supply interruption a data processing device (the physical computer 30), and return is made to step S21.

Figure 12:
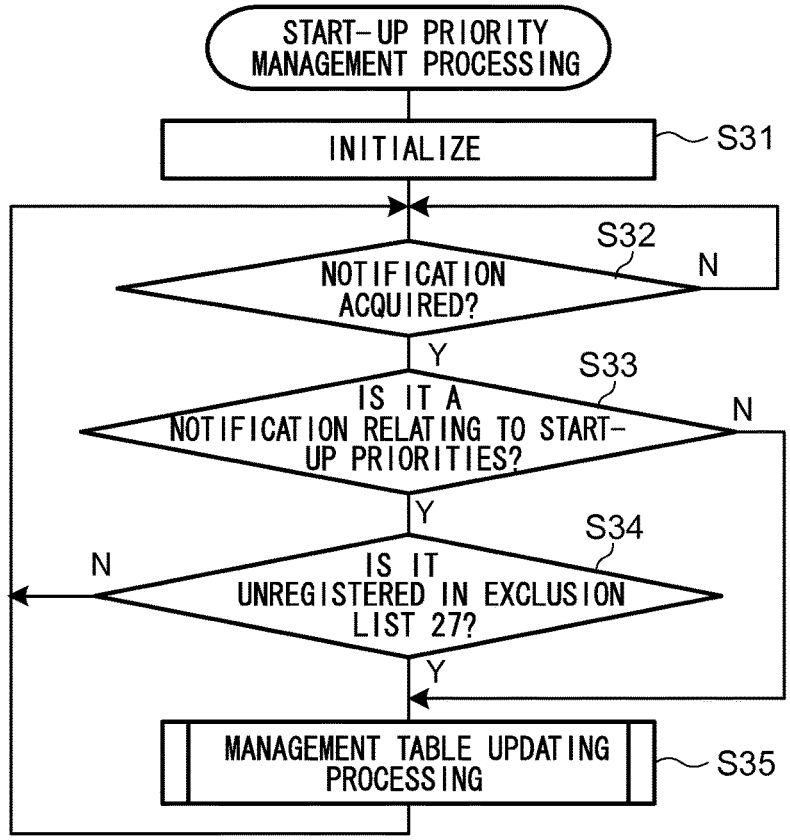
FIG. 12 is a flowchart illustrating start-up priority management processing.

Next, at step S31 of the start-up priority management processing illustrated in FIG. 12, the control section 26 initializes the management table 28. Specifically, the control section 26 registers the management table 28 with acquired data of data processing devices that include resource application management systems, and the like, that manage the network including the plural data processing devices being managed. For example, given the management table 28 illustrated in FIG. 7, the IP addresses are acquired as data of data processing devices, and the data processing device numbers are appended to the acquired IP addresses and registered in the management table 28. The control section 26 then sets the start-up priority of all of the data processing devices to "1". Note that at this stage the entries of the priority start-up data processing device number list are blank.

Furthermore, the exclusion list establishment section 25 initializes the exclusion list 27. Specifically, the exclusion list establishment section 25 registers the exclusion list 27 (for example, FIG. 6) with received exclusion data input by a user through input/output devices such as a mouse, keyboard, and monitor, not illustrated in the drawings.

Next, at step S32, the notification acquisition section 24 establishes whether or not data representing start-up priority relationships has been notified from the communication monitoring section 21, or power supply interruption data has been notified from the power source monitoring section 23. Transition is made to step S33 in cases in which either of the notifications has been acquired, and the establishment of the present step is repeated in cases in which neither of the notifications has been acquired.

At step S33, the notification acquisition section 24 establishes whether or not the notification acquired at step S32 is a notification of data representing a start-up priority relationship. Transition is made to step S34 in cases of a notification of data representing a start-up priority relationship, and transition is made to step S35 in cases of notification of power supply interruption data.

At step S34, the exclusion list establishment section 25 establishes whether or not the acquired data representing a start-up priority relationship is data unrelated to the start-up sequence of the data processing devices by establishing whether or not the exclusion list 27 is registered with the acquired data. Return is made to step S32 in cases in which the exclusion list 27 is registered with acquired data representing a start-up priority relationship. Transition is made to S35 in cases in which the exclusion list 27 is not registered with the acquired data representing a start-up priority relationship.

Figure 13:
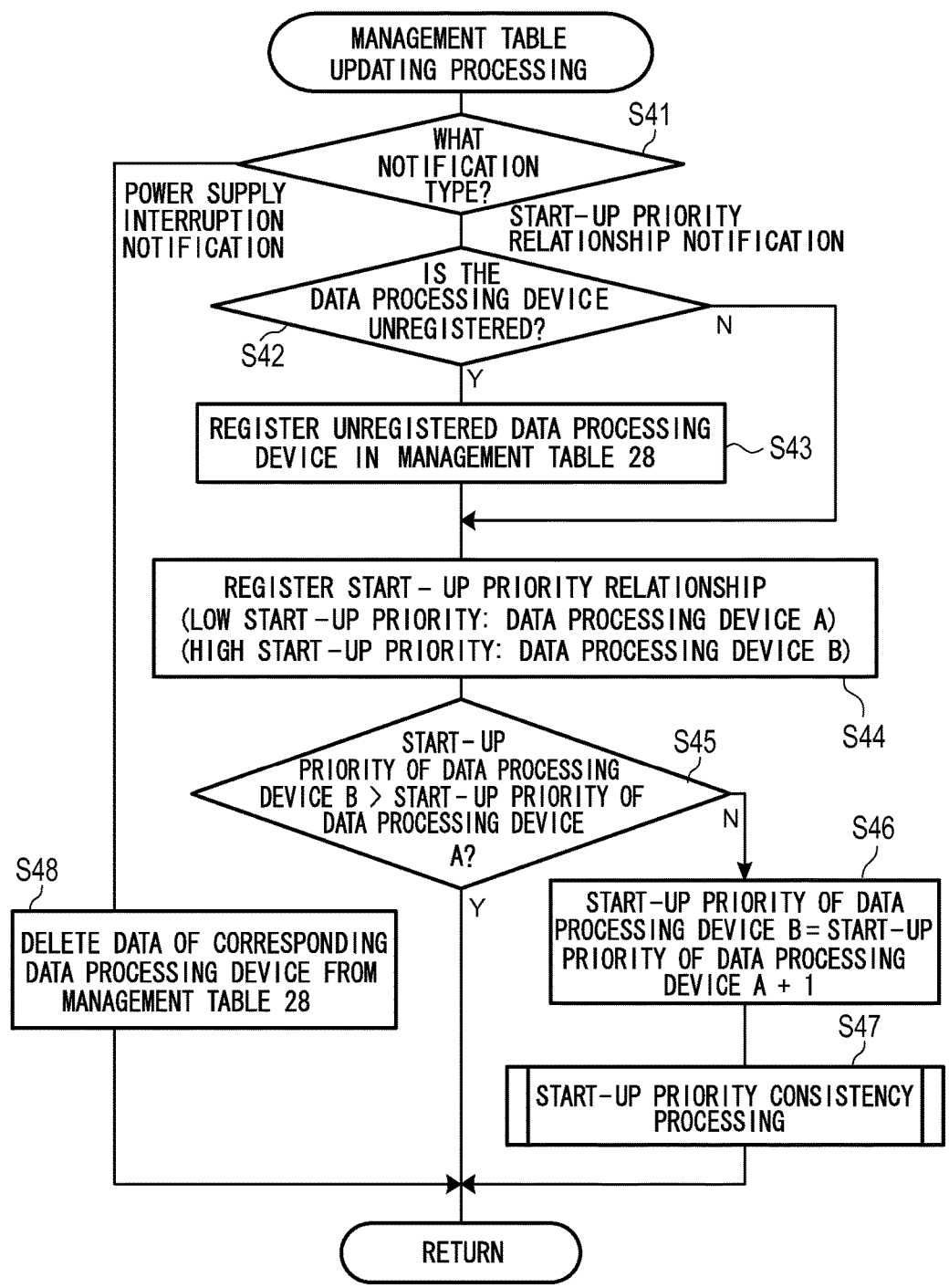
FIG. 13 is a flowchart illustrating management table updating processing.

At step S35 the control section 26 executes the management table updating processing illustrated in FIG. 13.

At step S41 of the management table updating processing illustrated in FIG. 13, the control section 26 establishes whether or not the notification acquired at step S32 is a notification of data representing a start-up priority relationship, or a notification of power supply interruption data. Transition is made to step S42 in cases of a notification of data representing a start-up priority relationship, and transition is made to step S48 in cases of a notification of power supply interruption data.

At step S42, the control section 26 establishes whether or not the management table 28 is not registered with data of the data processing device with higher start-up priority, or the data processing device with lower start-up priority, that are included in the data representing the start-up priority relationship. Transition is made to step S43 in cases in which such data is not registered, and transition is made to step S44 in cases in which such data is registered.

At step S43, the control section 26 registers the management table 28 with the IP address of the data processing device not registered in the management table 28 acquired from the data representing the start-up priority relationship, and appends the data processing device number. For example, given the current status of the start-up priority of each data processing device is illustrated in FIG. 7, and FIG. 8, the data representing the acquired start-up priority relationship is as illustrated in FIG. 3. In this case, the data processing device with the IP address "192.168.10.2" is not registered in the management table 28 illustrated in FIG. 7. The control section 26 registers the management table 28 with data of the data processing device having the IP address "192.168.10.2" as illustrated in FIG. 14, appends the data processing device number "5", and sets the start-up priority to "1". Note that the data processing device having the IP address "192.168.10.1" included in the data representing the start-up priority relationship illustrated in FIG. 3 corresponds to the data processing device 0 of the management table 28 illustrated in FIG. 7, and is therefore not registered.

Next, at step S44, the control section 26 registers the management table 28 with the data representing the start-up priority relationship. For example, data of the data processing device A, serving as the data processing device having lower start-up priority is included, and data of the data processing device B, serving as the data processing device having higher start-up priority is included in the data representing the start-up priority relationship. In this case, the control section 26 appends the data processing device number of the data processing device B to the "priority start-up data processing device number list" column of the data processing device A in the management table 28.

More specific explanation will be given regarding a case in which the data representing the start-up priority relationship of FIG. 3 is acquired, and the management table 28 is in the state illustrated in FIG. 14. In the data representing the start-up priority relationship of FIG. 3, the data processing device A having lower start-up priority is a data processing device 5, and the data processing device B having higher start-up priority is the data processing device 0. A "0" is therefore appended to the "priority start-up data processing device number list" of the data processing device 5 as illustrated in FIG. 15.

Next, at step S45, the control section 26 establishes whether or not the start-up priority of the data processing device B is higher than the start-up priority of the data processing device A in the management table 28. In cases in which the start-up priority of data processing device B>the start-up priority of data processing device A, since the acquired data representing the start-up priority relationship matches data registered in the management table 28, the management table updating processing terminates, and return is made to the start-up control processing illustrated in FIG. 12.

However, in cases in which the start-up priority of the data processing device B≤the start-up priority of the data processing device A, the acquired data representing the start-up priority relationship does not match the data registered in the management table 28. Transition is then made to step S46, and the control section 26 updates the start-up priority of the data processing device B to be higher than the start-up priority of the data processing device A. For example, the start-up priority of the data processing device B is updated to a value of 1 added to the start-up priority of the data processing device A.

Figure 16:
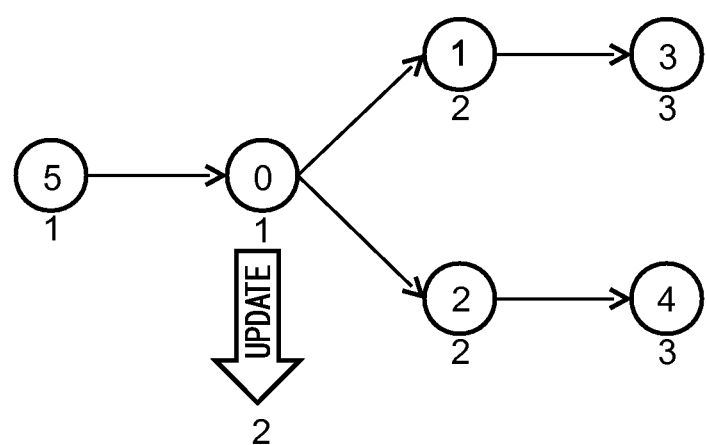
FIG. 16 is a diagram illustrating relationships between start-up priorities of data processing devices.

In the steps S44 to S46, in cases in which the management table 28 is updated based on the acquired data representing the start-up priority relationship, an object is consistency with start-up priorities of data processing devices included in the acquired data representing the start-up priority relationships. However, as illustrated in FIG. 16, there are cases in which the start-up priorities of all of the control-target data processing devices are made inconsistent by updating start-up priorities between data processing devices included in the acquired data representing the start-up priority relationships.

Figure 17:
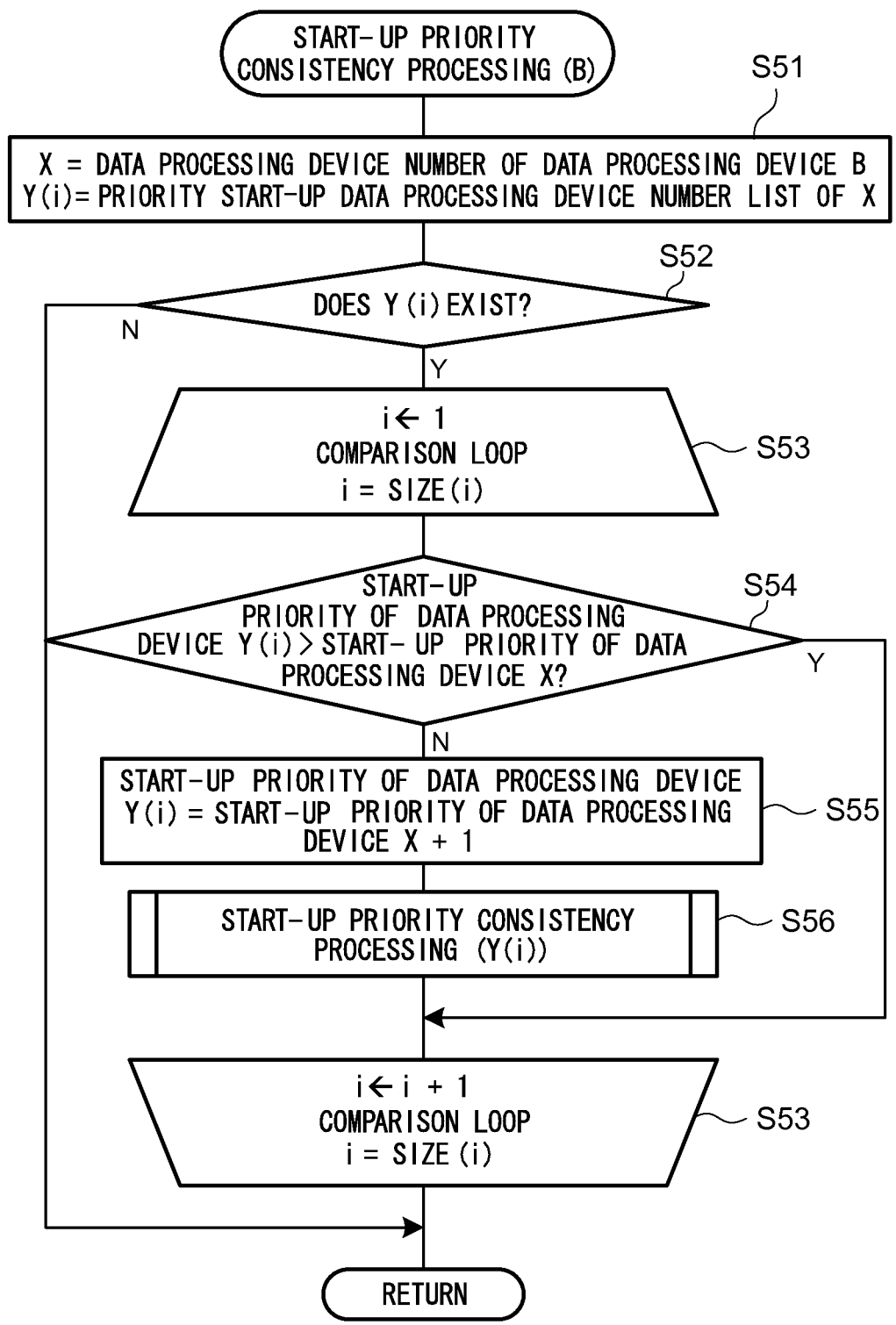
FIG. 17 is a flowchart illustrating start-up priority matching processing.

At step S47 the control section 26 executes start-up priority consistency processing (B), illustrated in FIG. 17. Note that "(B)" denotes start-up priority consistency processing performed based on the data processing device B that has high start-up priority, included in the acquired data representing the start-up priority relationship.

At step S51 of the start-up priority consistency processing illustrated in FIG. 17, the control section 26 sets a variable X to the data processing device number of the data processing device B. Moreover, the control section 26 sets a variable Y(i) to the data processing device number registered in the priority start-up data processing device number list of the data processing device X in the management table 28. Note that for i, i=1, 2, and so on to size(i), and size(i) is the number of data processing device numbers registered in the priority start-up data processing device number list. Here setting is made such that X=0, Y(1)=1, Y(2)=2.

Next, at step S52, the control section 26 establishes whether or not Y(i) is set with a value. In cases in which Y(i) is not set with a value, return is made to management table update processing without change as illustrated in FIG. 13, so that start-up priorities of other data processing devices are not affected by the processing of steps S44 to S46. Since Y(i) here is set with a value, transition is made to step S53.

At step S53, the control section 26 sets the variable i to 1, and while incrementing the variable i until the variable i is equal to size(i), executes a comparison loop of steps S54 to S56.

At step S54, the control section 26 establishes whether or not the start-up priority of the data processing device Y(i) is higher than the start-up priority of the data processing device X in the management table 28. In cases in which the start-up priority of the data processing device Y(i)≤the start-up priority of the data processing device X, the start-up priorities of all of the data processing devices are not consistent. In this case, transition is made to step S55, and the control section 26 updates the start-up priority of the data processing device Y(i) so as to be higher than the start-up priority of the data processing device X. For example, the start-up priority of the data processing device Y(i) is updated to a value of 1 added to the start-up priority of the data processing device X.

Next, at step S56, the control section 26 executes the start-up priority consistency processing (Y(i)). The start-up priority consistency processing (Y(i)) is substantially the same as the start-up priority consistency processing (B) illustrated in FIG. 17 except in that X is set to the data processing device number of the data processing device Y(i) at step S51.

However, at step at S54, in cases where it is established that the start-up priority of the data processing device Y(i)>the start-up priority of the data processing device X, steps S55 and S56 are skipped.

Figures 18, 19:
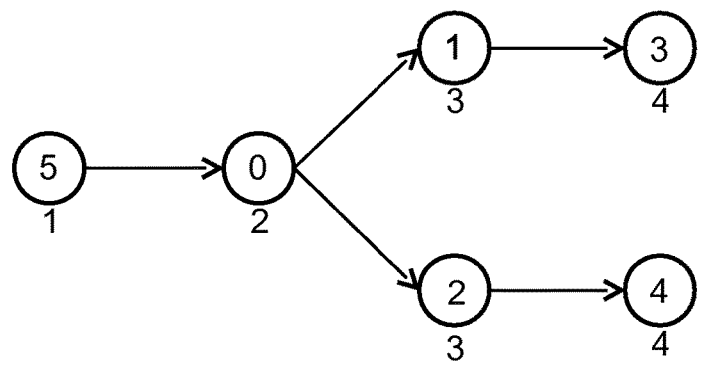
FIG. 18 is a diagram illustrating an example of a management table.
FIG. 19 is a diagram illustrating relationships between start-up priorities of data processing devices.

In cases where the variable i has reach size(i), the comparison loop of step S53 terminates, and return is made to the management table updating processing illustrated in FIG. 13. The management table 28 is thereby updated as illustrated in FIG. 18. The data registered in the management table 28, illustrated in FIG. 18, represents a state in which consistency is reached between the start-up priorities of all of the control-target data processing devices as illustrated in FIG. 19.

However, at step S48 of the management table updating processing illustrated in FIG. 13, the control section 26 deletes the data of the "priority start-up data processing device number list" of the data processing device indicated by the acquired power supply interruption data in the management table 28, and sets the "start-up priority" thereof to 1. Since start-up priority relationships, established based on communication in three-way handshake connections occurring immediately after start-up of each of the data processing devices, are registered the management table 28, more reliable updating of the management table 28 is thereby enabled.

The control section 26 controls such that when plural data processing devices are started-up, each of the data processing devices is started-up in order of highest start-up priority registered in the management table 28, updated as described above.

As described above, according to the start-up control system of the present exemplary embodiment start-up priority relationships between data processing devices are acquired from communication between data processing devices, and the start-up priorities of data processing devices are managed based on start-up priority relationships between data processing devices. Therefore, even in cases in which the number of control-target data processing devices increases, control of the start-up sequence of plural data processing devices is enabled with consideration for communication initiation processing without relying on manual operation.

Note that in the exemplary embodiment described above, explanation has been given of a case in which the communication monitoring section establishes start-up priority relationships between data processing device; however, there is no limitation thereto. For example, the communication monitoring section may notify the start-up control device of data representing content of detected communication between data processing devices, without establishing the start-up priority relationship. In this case, the notification acquisition section may acquire data representing the content of communication, and establish the start-up priority relationships between data processing devices and acquire data indicating the start-up priority relationship based on the acquired data representing the content of communication. In this case the function of monitoring network communication, provided to the switch or the like, may be employed as the communication monitoring section. Application of technology disclosed herein to present systems is thereby enabled, with simple setup, and without the need for providing a function for establishing start-up priority relationships to a separate switch or the like.

However, in cases in which the communication monitoring section, provided to a switch or the like, establishes start-up priority relationships as in the present exemplary embodiment, distribution of processing load is enabled, and a reduction in processing load on the start-up control device is enabled. Moreover, a reduction in the amount of traffic between the communication monitoring section and the start-up control device is enabled.

Although explanation has been given above in which the start-up control program 50 is pre-stored (installed) in the storage section 46, it is possible to provide the start-up control program 50 in a format recorded on a recording medium such as a CD-ROM or a DVD.

One aspect of the present invention enables control of start-up sequences of plural data processing devices to be considered in communication initiation processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a start-up control program that causes a computer including a hardware processor to execute a process, the process comprising:
by the hardware processor, acquiring data relating to communication processing from a communication monitoring section, the communication monitoring section monitoring the communication processing between a plurality of data processing devices when a connection between the plurality of data processing devices is initiated; and
by the hardware processor, based on the acquired data relating to the communication processing, controlling start-up of the plurality of data processing devices such that a data processing device that transmitted a response to a request for the connection is started-up earlier than a data processing device that transmitted the request.

2. The non-transitory recording medium of claim 1, the process further comprising:
from the acquired data relating to the communication processing, excluding any data unrelated to a start-up sequence of the data processing devices such that the unrelated data is not employed in the start-up control.

3. The non-transitory recording medium of claim 1, wherein, in the process, the acquiring of the data relating to the communication processing comprises:
by the hardware processor, acquiring, from the communication monitoring section, data indicating a start-up priority relationship established by the communication monitoring section, which is disposed on a communication channel between the plurality of data processing devices, which detects communication including the acquired data relating to the communication processing, and which, based on the acquired data relating to the communication processing, establishes the start-up priority relationship between the data processing device that transmitted the request and the data processing device that transmitted the response to the request.

4. The non-transitory recording medium of claim 3, wherein, the communication monitoring section does not notify, in response to data that is monitored by the communication monitoring section, if the data is the same as the acquired data relating to the communication processing for which notification was previously transmitted by the communication monitoring section.

5. The non-transitory recording medium of claim 1, wherein, in the process, the acquiring of the data relating to the communication processing comprises:
by the hardware processor, acquiring data indicating the content of communication between the plurality of data processing devices from the communication monitoring section that is disposed on a communication channel between the plurality of data processing devices; and
by the hardware processor, establishing a start-up priority relationship between the data processing device that transmitted the request and the data processing device that transmitted the response to the request based on the data indicating the content of the communication.

6. The non-transitory recording medium of claim 1, wherein, in the process:
the acquired data relating to the communication processing comprises data that identifies the data processing device that transmitted the request and the data processing device that transmitted the response to the request, based on communication during a three-way handshake connection.

7. The non-transitory recording medium of claim 6, wherein, in the process:
the acquiring of the data relating to the communication processing comprises:
by the hardware processor, acquiring data from data processing devices to which power supply has been interrupted from a power supply monitoring section that is disposed at each of the plurality of data processing devices and that monitors whether or not power supply for each of the plurality of the data processing devices has been interrupted; and
the start-up control of the plurality of data processing devices comprises:
by the hardware processor, employing, for the data processing devices indicated by the acquired data from the data processing devices to which power supply has been interrupted, data that identifies the data processing device that transmitted the request and the data processing device that transmitted the response to the request based on a communication acquired during a first three-way handshake connection after acquiring data from the data processing devices to which the power supply has been interrupted.

8. A start-up control device, comprising:
a hardware processor configured to execute a process, the process comprising:
by the hardware processor, acquiring data relating to the communication processing from a communication monitoring section, the communication monitoring section monitoring the communication processing between a plurality of data processing devices when a connection between the plurality of data processing devices is initiated; and by the hardware processor, based on the acquired data relating to the communication processing, controlling start-up of the plurality of data processing devices such that a data processing device that transmitted a response to a request for the connection is started-up earlier than a data processing device that transmitted the request.

9. The start-up control device of claim 8, the process further comprising:

from the acquired data relating to the communication processing, excluding any data unrelated to a start-up sequence of the data processing devices such that the unrelated data is not employed in the start-up control.

10. The start-up control device of claim 8, wherein, in the process, the acquiring of the data relating to the communication processing comprises:

by the hardware processor, acquiring, from the communication monitoring section, data indicating a start-up priority relationship established by the communication monitoring section, which is disposed on a communication channel between the plurality of data processing devices, which detects communication including the acquired data relating to the communication processing, and which, based on the acquired data relating to the communication processing, establishes the start-up priority relationship between the data processing device that transmitted the request and the data processing device that transmitted the response to the request.

11. The start-up control device of claim 10, wherein, the communication monitoring section does not notify, in response to data that is monitored by the communication monitoring section, if the data is the same as the acquired data relating to the communication processing for which notification was previously transmitted by the communication monitoring section.

12. The start-up control device of claim 8, wherein, in the process, the acquiring of the data relating to the communication processing comprises:

by the hardware processor, acquiring data indicating the content of communication between the plurality of data processing devices from the communication monitoring section that is disposed on a communication channel between the plurality of data processing devices; and by the hardware processor, establishing a start-up priority relationship between the data processing device that transmitted the request and the data processing device that transmitted the response to the request based on the data indicating the content of the communication.

13. The start-up control device of claim 8, wherein, in the process:

the acquired data relating to the communication processing comprises data that identifies the data processing device that transmitted the request and the data processing device that transmitted the response to the request based on communication during a three-way handshake connection.

14. The start-up control device of claim 13, wherein, in the process:

the acquiring of the data relating to the communication processing comprises:

by the hardware processor, acquiring data from data processing devices to which power supply has been interrupted from a power supply monitoring section that is disposed at each of the plurality of data processing devices and that monitors whether or not power supply for each of the plurality of the data processing devices has been interrupted; and the start-up control of the plurality of data processing devices comprises:

by the hardware processor, employing, for the data processing devices indicated by the acquired data from the data processing devices to which power supply has been interrupted, data that identifies the data processing device that transmitted the request and the data processing device that transmitted the response to the request based on a communication acquired during a first three-way handshake connection after acquiring data from the data processing devices to which the power supply has been interrupted.

15. A start-up control method, comprising:

by the hardware processor, acquiring data relating to communication processing from a communication monitoring section, the communication monitoring section monitoring the communication processing between a plurality of data processing devices when a connection between the plurality of data processing devices is initiated; and by a hardware processor, based on the acquired data relating to the communication processing, controlling start-up of the plurality of data processing devices such that a data processing device that transmitted a response to a request for the connection is started-up earlier than a data processing device that transmitted the request.

* * * * *